United States Patent [19]
Stankewitz

[11] 3,833,283
[45] Sept. 3, 1974

[54] ILLUMINATION EQUIPMENT FOR MICROSCOPES

[75] Inventor: Hans-Werner Stankewitz, Steindorf, Germany

[73] Assignee: Ernst Leitz, GmbH, Wetzlar, Germany

[22] Filed: Jan. 28, 1974

[21] Appl. No.: 437,143

Related U.S. Application Data

[62] Division of Ser. No. 239,671, March 30, 1972, Pat. No. 3,799,645.

[30] Foreign Application Priority Data
Apr. 5, 1971    Germany.............................. 2116625

[52] U.S. Cl. .................................... 350/87, 350/38
[51] Int. Cl. ............................................ G02b 21/08
[58] Field of Search ............................... 350/87–89, 350/38

[56]    References Cited
UNITED STATES PATENTS
3,137,761    6/1964    Conradi et al. ...................... 350/87
3,679,287    7/1972    Takahashi et al...................... 350/87

FOREIGN PATENTS OR APPLICATIONS
1,147,715    4/1969    Great Britain ....................... 350/87

Primary Examiner—David H. Rubin
Attorney, Agent, or Firm—Krafft & Wells

[57]    ABSTRACT

In an illumination equipment for microscopes comprising among other elements a lamp, a lamp aperture and an auxiliary condenser lens which may be interpositioned into the light path in addition to a stationary main condenser for varying the aperture of the equipment the improvement comprises a lens element which is inserted into and/or withdrawn from the light path upon interpositioning the auxiliary condenser lens. It is thereby achieved that the position of the image of both the lamp and the lamp aperture remains stationary when the aperture of the equipment is varied, thus eliminating the necessity for refocusing the image of the lamp aperture into the object plane and the image of the lamp into infinity.

2 Claims, 4 Drawing Figures

ILLUMINATION EQUIPMENT FOR MICROSCOPES

This is a division, of application Ser. No. 239,671, filed Mar. 30, 1972, now U.S. Pat. No. 3,799,645 issued Mar. 26, 1974.

BACKGROUND OF THE INVENTION

The invention relates to an illumination equipment as used with microscopes.

It is will known in the art that in a microscope the illumination must be adapted to the objective used, at least as far as the condenser aperture and the field of illumination is concerned. Adaptation is usually accomplished by exchanging the condensors as a whole which are adjusted to the various objectives, or by introducing different auxiliary condenser lenses into the light path in addition to a stationary main condenser. The introduced auxiliary lenses change the focal length of the condenser as a whole. As a consequence thereof the image of the lamp diaphragm must be refocused into the object plane. This is done either by displacing the main condenser along the optical axis or by interpositioning a further lens element underneath the main condenser, whereby the back focal plane is displaced. However, both ways result in a variation of the position of the lamp image if the collector lens, which is usually arranged in front of the lamp, is stationary. Only by displacing the collector lens also, this variation can be eliminated.

Therefore, in the known illumination devices either the main condenser and the collector lens have to be displaceable along the optical axis or the main condenser may be stationary and only the collector lens is displaceable while the proper imaging of the lamp diaphragm is achieved by introducing an auxiliary condenser lens.

These additional measures must be performed by the operator and require a considerable skill. If, on the other hand, these measures are automatically coupled with the exchange movement of the condensor great technical difficulties must be overcome.

It is therefore an object of the invention to provide an illumination equipment comprising an additional auxiliary condenser lens wherein the image of the lamp diaphragm and the image of the lamp remain properly positioned when the condenser is adapted to a different objective.

SUMMARY OF THE INVENTION

The above stated object is attained by introducing an additional lens element between the collector and the main condenser which lens element keeps the location of the images of the lamp diaphragm and the lamp stationary when the condenser aperture is varied by interpositioning or withdrawing the auxiliary condenser lens.

The additional lens element and the auxiliary condenser lens may be operated by a common mechanism. Likewise a common mechanism may be provided for jointly operating the additional lens element and the setting of the aperture diaphragm. In some embodiments, however, it will prove advantageous to provide a separate diaphragm aperture which may be operated together with the additional lens element.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1A:
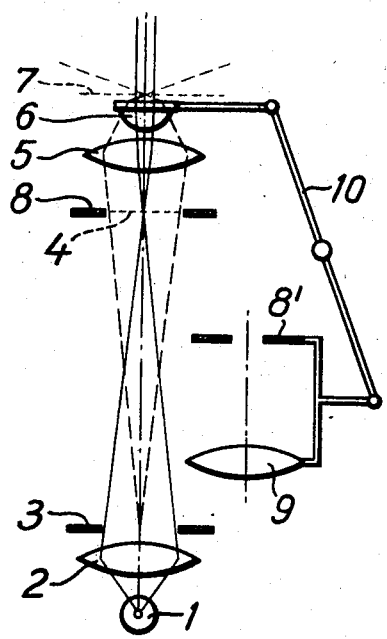
FIG. 1a shows an illumination equipment having a large aperture and a small lamp field.

Referring now to the drawings, in FIG. 1a a lamp 1 is imaged by a collector lens 2 through a field diaphragm 3 into the back focal plane 4 of a condenser. The condenser comprises a main condenser 5 and an auxiliary condenser 6 which may be interpositioned into the light path and withdrawn therefrom as circumstances may require. The condenser images the image of the lamp 1 into infinity. Besides, the condenser forms an image of the field diaphragm 3 in the object plane 7. For adjusting the illumination aperture of the equipment, there is provided an aperture diaphragm 8 in the back focal plane 4 of the condenser.

For enlarging the lamp field in the object plane 7, which is shown in the Figures in solid lines, the auxiliary condenser 6 is withdrawn from the light path and an additional lens element 9 is introduced. The members 6 and 9 are interconnected by a rod 10 having a pivot at 10a.

Figure 1B:
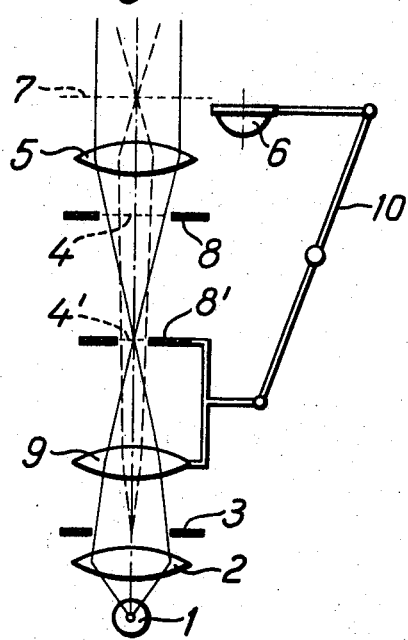
FIG. 1b shows the equipment of FIG. 1a changed to a small aperture and a large lamp field.

FIG. 1b shows the illumination equipment having now an enlarged lamp field and a reduced aperture. By withdrawing the auxiliary condenser 6 the back focal plane 4 of the condenser has been shifted to the back focal plane 4' of the main condenser 5. The lamp 1 is now imaged into this back focal plane 4' by the additional lens element 9 in combination with the collector lens 2. Consequently, the image of the lamp 1 formed by the main condenser 5 is again produced in infinity. At the same time the additional lens element 9 is so designed that a sharp picture of the field diaphragm 3 appears again in the object plane 7.

However, the aperture diaphragm 8 can now no longer be used for regulating the aperture since a closing of this diaphragm would also influence the path of the illuminating light rays. In order to utilize the enlarged lamp field to its full extent it will be advantageous to open the aperture diaphragm when the additional lens element 9 is introduced. This can be accomplished automatically by means of a mechanical connection not shown for sake of clarity and simplicity of the drawings. At the same time, a new aperture diaphragm 8' has to be introduced into the back focal plane 4'. In the illustrated embodiment the new aperture diaphragm 8' is rigidly coupled to the additional lens element 9 for joint introduction and withdrawal.

Because of the influence which the additional lens element 9 has on the forming of the image of the lamp 1 it will be advisable to include the lens 9 into the calculation when computing the state of correction of the effective condenser.

Figure 2A:
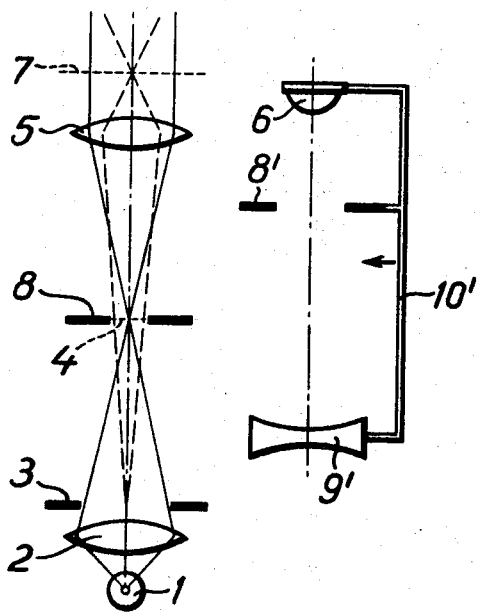
FIG. 2a shows an illumination equipment having a small aperture and a large lamp field.

FIG. 2a shows an illumination equipment which has a large lamp field and a small aperture. The reference symbols used here are the same as used in connection with the FIGS. 1a and 1b. The equipment can be changed to one having a small lamp field and an enlarged aperture by inserting into the light path an additional lens element 9' together with an auxiliary condenser 6 by means of a common rod 10'. Introduction of the auxiliary condenser 6 displaces the back focal plane 4 of the condenser system in the direction towards the main condenser 5 to a new position 4'.

Therefore, the refractive power of the additional lens 9' must be negative so that the lamp 1 is again imaged in the focal plane.

Figure 2B:
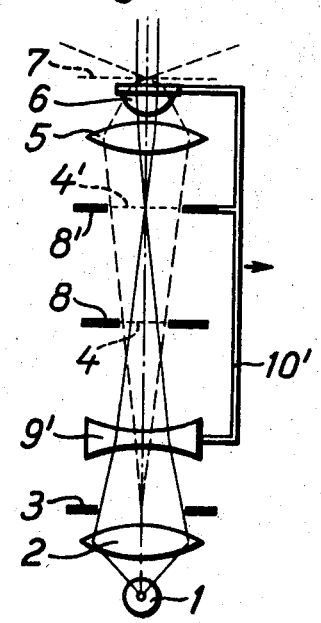
FIG. 2b shows the equipment of FIG. 2a changed to a large aperture and a small lamp field.

FIG. 2b shows the equipment of FIG. 2a with the auxiliary condenser and the additional lens element in the light path. With regard to the aperture diaphragm 8 the same conditions prevail as have already been described in connection with the FIGS. 1a and 1b. The new diaphragm 8' is also connected to the rod 10'. The illumination equipment may be adjustable in its aperture to a greater number of microscopes by using a plurality of auxiliary condensers and additional lens elements arranged in pairs, for example, on coupled rotating turret plates.

Although the movable members in the described embodiments are illustrated as being mechanically connected to one another it is quite possible to insert and withdraw these members independently. It will then be advantageous to provide indicating means, for example colored markings, for showing when the proper position of the additional lens element and the diaphragm is obtained which corresponds to a desired change of the condenser aperture.

What is claimed is:

1. Illumination equipment for microscopes having:
   a stationary lamp projecting light having an optical axis;
   a fixedly mounted collector lens arranged adjacent said stationary lamp along said optical axis;
   a field diaphragm located along said optical axis through which the light from said collector lens passes;
   a fixedly mounted aperture diaphragm located along said optical axis through which the light from said field diaphragm passes;
   a fixedly mounted main condenser lens located along said optical axis through which the light from said aperture diaphragm passes;
   an auxiliary condenser lens selectively located along said optical axis through which the light from said main condenser lens passes, said main condenser lens and said auxiliary condenser lens projecting an image of said field diaphragm into an object plane located along said optical axis and having a back focal plane coincident with said aperture diaphragm for adapting said aperture diaphragm to an aperture of a microscope objective;
   an additional lens element having a negative refractive power selectively located along said axis in the light path between said field diaphragm and said main condenser for maintaining positions of images of said field diaphragm and of said lamp in relationship to said selective location of said auxiliary condenser lens;
   an additional aperture diaphragm selectively located along said optical axis through which the light from said additional collecting lens element passes; and means for simultaneously inserting said auxiliary condenser lens, said additional lens element and said additional aperture diaphragm into said optical axis.

2. The illumination equipment of claim 1, wherein said means for simultaneously inserting is a rod having a first end fixedly connected to said auxiliary condenser lens, a second end fixedly connected to said additional lens element and a mid portion fixedly connected to said additional aperture diaphragm.

* * * * *